(12) United States Patent
Montgomery et al.

(10) Patent No.: US 6,765,709 B1
(45) Date of Patent: Jul. 20, 2004

(54) ACTIVE COMPENSATION FOR TRANSIENT THERMAL EFFECTS IN ACOUSTO-OPTIC DEVICES

(75) Inventors: Robert Morris Montgomery, Indialantic, FL (US); Pat O. Bentley, West Melbourne, FL (US); Peter Alan Wasilousky, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/424,660

(22) Filed: Apr. 28, 2003

(51) Int. Cl.[7] .................................................. G02F 1/11
(52) U.S. Cl. ...................... 359/285; 359/288; 359/305; 359/311
(58) Field of Search ................................. 359/285, 288, 359/305, 307, 310, 311, 312

(56) References Cited

U.S. PATENT DOCUMENTS

| | | | | |
|---|---|---|---|---|
| 4,762,383 A | * | 8/1988 | Yamashita et al. | 385/7 |
| 4,778,514 A | * | 10/1988 | Tanaka et al. | 504/315 |
| 4,788,514 A | * | 11/1988 | Fox | 359/285 |
| 6,046,839 A | * | 4/2000 | Ito et al. | 359/246 |

* cited by examiner

Primary Examiner—Hung Xuan Dang
Assistant Examiner—Tuyen Tra
(74) Attorney, Agent, or Firm—Allen, Dyer, Doppelt, Milbrath & Gilchrist, P.A.

(57) ABSTRACT

A multi-channel acousto-optic modulator contains an integrated structure for providing active compensation for transient thermal effects. A plurality of electro-thermal elements in the form of resistive strips are interleaved with acoustic wave launching transducers, to which signals are applied for modulating respective acoustic waves launched into an acousto-optic medium. The resistive strips receive electrical signals that controllably introduce respective thermal energy components into the acousto-optic medium adjacent to the signal launch transducers, in a manner that causes the overall spatial distribution of thermal energy in the acousto-optic medium to have a prescribed characteristic. By establishing an thermal gradient characteristic across all the channels of the RF signal processor, and compensating each channel on an individual basis, the invention effectively compensates for time-dependent variations in heating, resulting in a substantially level thermal behavior.

19 Claims, 2 Drawing Sheets

ACTIVE COMPENSATION FOR TRANSIENT THERMAL EFFECTS IN ACOUSTO-OPTIC DEVICES

FIELD OF THE INVENTION

The present invention relates in general to optical modulation systems and components therefor, and is particularly directed to a new and improved apparatus and method for providing active compensation for transient thermal effects in acousto-optic modulator devices.

BACKGROUND OF THE INVENTION

Acousto-optic subsystems are commonly employed in optical modulation systems to process high frequency signals. Because of the small physical volume of such subsystems and the typically random data-pattern nature of the signals they process, acousto-optic signal processing arrangements are subject to thermal transients, which can lead to distortion of the optical beam path, and degrade system performance. This thermal distortion problem is illustrated in FIG. 1, which is a diagrammatic cross-sectional side view of a prior art acousto-optic modulator.

As shown therein, a generally solid rectangular bulk acousto-optic medium 10 (such as quartz glass) is supported within a heat sink mounting structure comprised of a thermal extraction platform 11, on which a main substrate 12 is mounted. An elastomer mount 13 is inserted into a cavity 14 of the main substrate 12 and is sized to receive the acousto-optic medium 10. An acoustic energy launch transducer 15 is coupled to a top surface 16 of the bulk material 10. A thermally conductive layer cover or bar 17 overlies and is mounted flush with the top of the structure, so as to provide a rigid, thermal extraction enclosure.

As indicated by thermal flow arrows 18, the acousto-optic architecture of FIG. 1 is designed to 'remove' heat through the top, bottom and sidewalls of the bulk material 10. In so doing, however, the apparatus of FIG. 1 creates a significant gradient in the thermal energy flow profile or characteristic within the bulk material. Moreover, the relatively random nature of the modulation signals applied to the launch transducer introduces a time variation to the thermal characteristic. Both of these variations can contribute to unwanted deviations in the optical beam path and thereby degrade optical performance.

Indeed, it can be expected that a multi-channel acousto-optic signal processor will be subjected to substantial variations in drive signals and thereby significant variations in thermal gradients in the vicinity of each acoustic launch electrode, as a result of the random nature of each channel of modulation signals being processed. In a typical thirty-two channel signal processor, these differing thermal conditions can contribute to substantial distortion in the optical beam path.

SUMMARY OF THE INVENTION

In accordance with the present invention, the above-described thermal distortion problem of conventional acousto-optic signal processing architectures is substantially mitigated by augmenting the electrode structure through which acoustic energy is launched into the bulk material with one or more adjacent strips of electro-thermal (resistive) material. These additional resistive strips serve to provide active and dynamic thermal compensation for transient thermal effects in both axial and side directions through the bulk material. In a multichannel system, the invention employs an interleaved distribution of electro-thermal compensation resistive strip electrodes, which are terminated in a common conductor layer.

Each auxiliary resistive strip electrode is driven by a prescribed DC bias voltage, that serves to actively introduce thermal energy into a respective surface portion of the bulk material, which is immediately adjacent to that portion of the bulk material upon which a launch transducer is mounted. This active injection of thermal energy along opposite sides of the launch transducers effectively 'softens' or 'spreads out' the thermal gradients produced thereby and thereby effectively creates a predictable thermal profile within the bulk material.

In order to effectively 'flatten' the overall or composite thermal gradient characteristic of a multi- (e.g., thirty-two) channel system, each channel has a dedicated a control circuit for establishing the appropriate electrical bias voltage to be applied to a respective resistive strip. A respective control circuit includes a comparator having has a first input coupled to receive a first voltage representative of a prescribed level of electrical energy to be applied to the electro-thermal element. A second comparator input is coupled to an RF power detector that monitors the RF power being applied to the launch electrode adjacent to the resistive strip. A third input of the comparator is coupled to a DC power detector, which monitors the DC power supplied to the resistive strip by the output of the comparator.

The voltage applied to the first input of the comparator is set at a prescribed value that is higher than the average RF power that will be imparted to the launch transducer. If a voltage representative of the detected RF power is less than this voltage, the comparator will actively drive its output with a voltage corresponding to the difference between the prescribed level and the detected RF value, as the comparator monitors the DC power detector to determine how much additional power, if any, is to be dynamically applied to the resistive strip. This active injection of thermal energy into the bulk material serves to establish an a priori thermal gradient characteristic across all the channels of the signal processor, and dynamically compensate each channel on an individual basis, so as to enable the invention to effectively track and compensate for time-dependent variations in heating, resulting in a substantially stable thermal profile. With the bulk material having a stable thermal profile, optical beam path distortion is no longer an issue.

DETAILED DESCRIPTION

Figure 1:
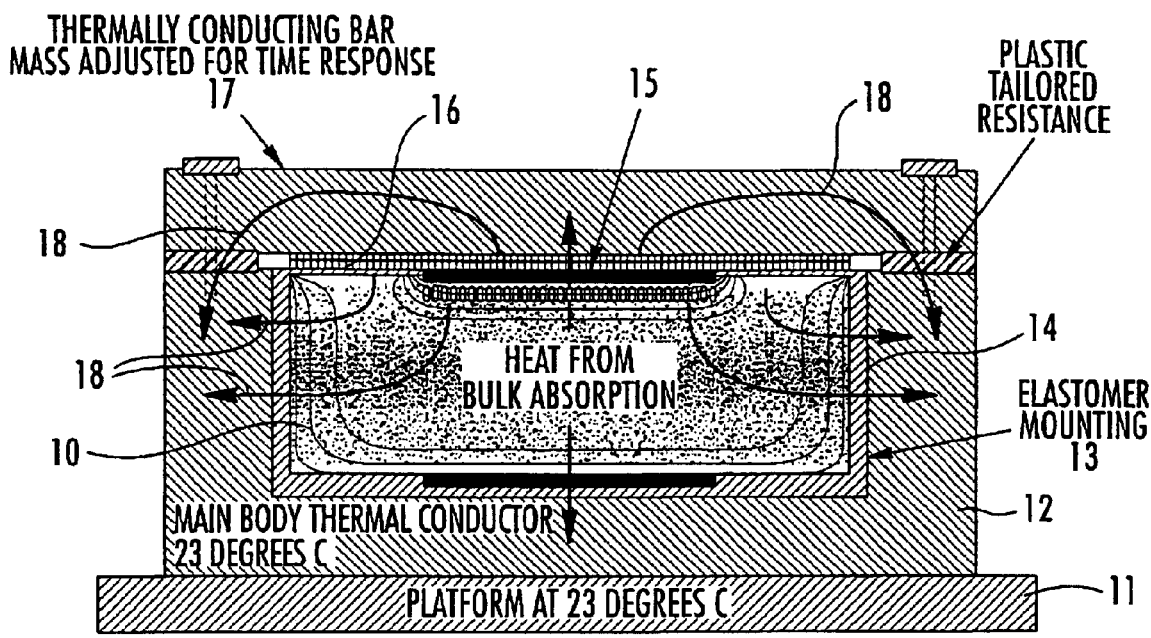
FIG. 1 is a diagrammatic cross-sectional side view of a prior art acousto-optic modulator.
Figure 2:
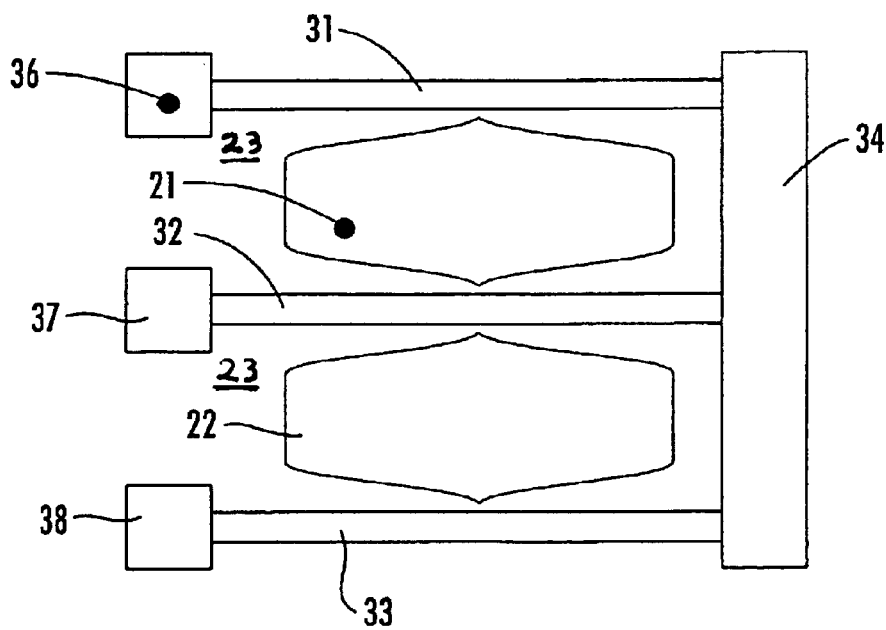
FIG. 2 is a diagrammatic plan view of a reduced complexity acousto-optic modulator configuration employing an interleaved distribution of active electro-thermal strips in accordance with the present invention.

Attention is now directed to FIG. 2, which is a diagrammatic plan view of a reduced complexity (e.g., two channel)

acousto-optic modulator of the type shown in FIG. 1 discussed above, but employing an interleaved distribution of active electro-thermal transient compensation strips in accordance with the present invention. The two channel embodiment of FIG. 2 shows acoustic wave launch transducers 21 and 22 disposed atop an underlying acousto-optic bulk medium 23. Pursuant to the invention, this acoustic beam-launching transducer structure is augmented by a plurality of electro-thermal elements, in the form of resistive stripe-shaped electrodes 31, 32 and 33, made of gold, and the like, which are arranged parallel to and interleaved with the launch transducers 21 and 22. The resistive strip electrodes 31, 32 and 33 are terminated at first ends thereof by respective DC biasing pads 36, 37 and 38 and at second ends thereof by a common conductor layer 34, such as a gold stripe electrode.

Figure 3:
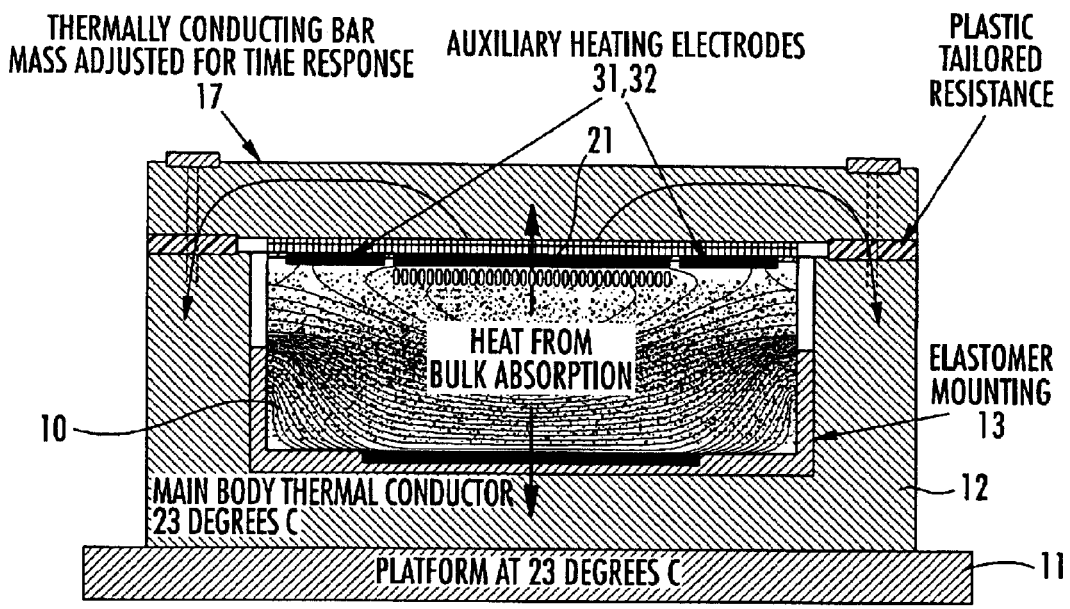
FIG. 3 is a diagrammatic cross-sectional side view of the thermal transient compensated acousto-optic modulator of the invention.

Each auxiliary resistive strip electrode is driven by a prescribed DC bias voltage, that serves to actively introduce thermal energy into a respective surface portion of the bulk material immediately adjacent to that upon which a respective launch transducer 21 is mounted. As shown in the cross-sectional view of FIG. 3, and from a comparison thereof with FIG. 1, the active injection of thermal energy along opposite sides of the launch transducer effectively 'softens' or 'spreads out' the thermal gradient produced thereby.

Figure 4:
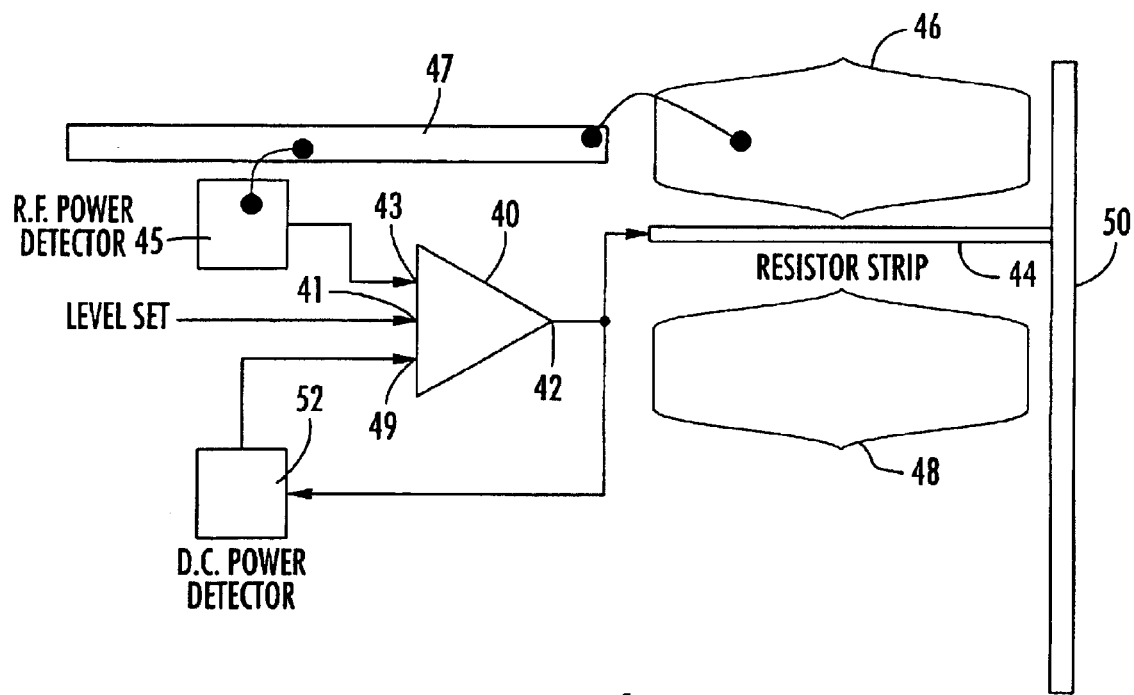
FIG. 4 diagrammatically illustrates a control circuit for establishing an electrical bias voltage to be applied to a respective resistive strip in the acousto-optic device of the thermal transient compensated device of the invention.

FIG. 4 diagrammatically illustrates a control circuit for establishing the appropriate electrical bias voltage to be applied to a respective resistive strip. In particular, FIG. 4 shows a comparator 40 having an output 42 coupled to a respective electro-thermal element 44, which is interleaved with or disposed between adjacent acoustic energy launch electrodes 46 and 48, and is terminated by conductive layer 50. Comparator 40 has a first input 41, which is coupled to receive a first voltage representative of a prescribed level of electrical energy to be applied to the electro-thermal element 44. A second comparator input 43 is coupled to an RF power detector 45 that monitors the RF power being applied to launch electrode 47 adjacent to the resistive strip 44. A third input 49 of the comparator 40 is coupled to a DC power detector 52, which monitors the DC power supplied to the resistive strip by the output of the comparator 40.

In operation, the voltage applied to the comparator 40 is set at a prescribed value that is higher than the average RF power that will be imparted to the launch transducer. As long as the detected RF power is less than this voltage, comparator 40 will drive its output with a voltage corresponding to the difference between the prescribed level and the detected RF value. Namely, output of the DC power detector 52 is monitored to determine how much additional power, if any, is to be applied to the resistive strip 44, so as to maintain the thermal energy supplied by the resistive strip 44 at a value that compensates for thermal transients in the acoustic bulk produced by variations in RF power.

As noted above, due to the random nature of each channel of signals being processed, it can be expected that a multi-channel acousto-optic signal processor will be subjected to substantial variations in drive signals and thereby significant variations in thermal gradients in the vicinity of each acoustic launch electrode. In a typical thirty-two channel signal processor, these differing thermal conditions can contribute to substantial distortion in the optical beam path. By establishing an a priori thermal gradient characteristic across all the channels of the signal processor, and dynamically compensating each channel on an individual basis in the manner described above, the present invention is able to effectively compensate for time-dependent variations in heating, resulting in a substantially level or even thermal behavior.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. For use with an acousto-optic device having at least one signal launch transducer coupled to the surface of an acousto-optic medium, and being adapted to receive electrical signals for modulating at least one acoustic wave launched into said acousto-optic medium, a method of compensating for thermal transient effects in said acousto-optic medium caused by the application of acoustic energy into said acousto-optic medium by said at least one signal launch transducer in response to said electrical signals, said method comprising the steps of:

(a) coupling at least one electro-thermal element to said acousto-optic medium adjacent to said at least one signal launch transducer; and (b) applying electrical energy to said at least one electro-thermal element based on a comparator output as a function of prescribed level of electrical energy and electrical energy imparted to the acousto-optic medium by the at least one signal launch transducer;

(c) introducing thermal energy into said acousto-optic medium adjacent to said at least one signal launch transducer; and (d) and causing the overall spatial distribution of thermal energy in said acousto-optic medium to conform with a prescribed characteristic.

2. The method according to claim 1, wherein said acousto-optic device has a plurality of signal launch transducers coupled to the surface of said acousto-optic medium, and to which electrical signals are applied for modulating respective acoustic waves launched into said acousto-optic medium, step (a) comprises interleaving a plurality of electro-thermal elements with said plurality of signal launch transducers on said acousto-optic medium, step (b) comprises applying respective electrical signals to said plurality of electro-thermal elements, step (c) comprises controllably introducing respective thermal energy components into said acousto-optic medium adjacent to said plurality of signal launch transducers, and step (d) comprises causing the overall spatial distribution of thermal energy in said acousto-optic medium to conform with said prescribed characteristic.

3. The method according to claim 1, wherein step (b) comprises (b1) defining a prescribed level of electrical energy to be applied to a respective electro-thermal element, (b2) monitoring electrical energy imparted to said acousto-optic medium by said launch transducer, and (b3) controlling electrical energy applied to said respective electro-thermal element as a function of said prescribed level of electrical energy defined in step (a) and electrical energy monitored in step (b).

4. The method according to claim 1, wherein a respective signal launch transducer is coupled to a first surface portion of said acousto-optic medium and said electro-thermal element comprises a resistive strip coupled to a second surface portion of said acousto-optic medium adjacent to said first surface portion thereof.

5. The method according to claim 1, wherein said acousto-optic device has a plurality of signal launch transducers coupled to a plurality of first surface portions of said acousto-optic medium, and to which electrical signals are applied for modulating respective acoustic waves launched into said acousto-optic medium, step (a) comprises coupling a plurality of electro-thermal resistive strips on a plurality of second surface portions of said acousto-optic medium adjacent to said first surface portions thereof, step (b) comprises applying respective electrical signals to said plurality of electro-thermal resistive strips, step (c) comprises controllably introducing respective thermal energy components into said acousto-optic medium adjacent to said plurality of signal launch transducers, and step (d) comprises causing the overall spatial distribution of thermal energy in said acousto-optic medium to conform with said prescribed characteristic.

6. The method according to claim 5, wherein step (b) comprises
(b1) defining a prescribed level of electrical energy to be applied to a respective electro-thermal element,
(b2) monitoring electrical energy imparted to said acousto-optic medium by a respective said launch transducer, and
(b3) controlling electrical energy applied to said respective electro-thermal element as a function of said prescribed level of electrical energy defined in step (a) and electrical energy monitored in step (b).

7. A multi-channel acousto-optic modulator structure comprising an acousto-optic medium, and a plurality of electro-thermal elements interleaved with acoustic wave launching transducers, to which signals are applied for modulating respective acoustic waves launched into said acousto-optic medium, said electro-thermal elements being coupled to receive electrical signals that controllably introduce respective thermal transient-compensating components of thermal energy into said acousto-optic medium adjacent to said acoustic wave launching transducers, in a manner that causes an overall spatial distribution of thermal energy in said acousto-optic medium to have a stable thermal characteristic, and a comparator operatively connected to a respective electro-thermal element that is operative to control electrical energy applied to the respective electro-thermal element by the output as a function of the prescribed level of electrical energy imparted to the acousto-optic medium by the launch transducer.

8. An apparatus comprising:
at least one signal launch transducer coupled to the surface of an acousto-optic medium, and being adapted to receive electrical signals for modulating at least one acoustic wave launched into said acousto-optic medium;
at least one electro-thermal element coupled to said acousto-optic medium adjacent to said at least one signal launch transducer, and being operative, in response to the application of electrical energy thereto, to introduce thermal energy into said acousto-optic medium adjacent to said at least one signal launch transducer, and cause the overall spatial distribution of thermal energy in said acousto optic medium to conform with a prescribed characteristic; and
a comparator operatively connected to a respective electro-thermal element that is operative to control electrical energy applied to the respective electro-thermal element by the output as a function of the prescribed level of electrical energy imparted to the acousto-optic medium by the launch transducer.

9. The apparatus according to claim 8, wherein said acousto-optic device has a plurality of signal launch transducers coupled to the surface of said acousto-optic medium, and to which electrical signals are applied for modulating respective acoustic waves launched into said acousto-optic medium, and wherein a plurality of electro-thermal elements are interleaved with said plurality of signal launch transducers on said acousto-optic medium, and are adapted to receive respective electrical signals so as to controllably introduce respective thermal energy components into said acousto-optic medium adjacent to said plurality of signal launch transducers in a manner that causes the overall spatial distribution of thermal energy in said acousto-optic medium to conform with said prescribed characteristic.

10. The apparatus according to claim 8, wherein said comparator has an output coupled to a respective electro-thermal element, and is coupled to receive a first input representative of a prescribed level of electrical energy to be applied to a respective electro-thermal element, a second input representative of electrical energy imparted to said acousto-optic medium by said launch transducer, and a third input representative of said output, said comparator being operative to control electrical energy applied to said respective electro-thermal element by said output as a function of said prescribed level of electrical energy and electrical energy imparted to said acousto-optic medium by said launch transducer.

11. The apparatus according to claim 8, wherein a respective signal launch transducer is coupled to a first surface portion of said acousto-optic medium and said electro-thermal element comprises a resistive strip coupled to a second surface portion of said acousto-optic medium adjacent to said first surface portion thereof.

12. The apparatus according to claim 8, wherein said acousto-optic device has a plurality of signal launch transducers coupled a plurality of first surface portions of said acousto-optic medium, and to which electrical signals are applied for modulating respective acoustic waves launched into said acousto-optic medium, and wherein a plurality of electro-thermal resistive strips are disposed on a plurality of second surface portions of said acousto-optic medium adjacent to said first surface portions thereof, and wherein said electro-thermal strips are coupled to receive respective electrical signals, so as to controllably introduce respective thermal energy components into said acousto-optic medium adjacent to said plurality of signal launch transducers in a manner that causes the overall spatial distribution of thermal energy in said acousto-optic medium to conform with said prescribed characteristic.

13. For use with an acousto-optic device having at least one signal launch transducer coupled to the surface of an acousto-optic medium, and being adapted to receive electrical signals for modulating at least one acoustic wave launched into said acousto-optic medium, a method of compensating for thermal transient effects in said acousto-optic medium caused by the application of acoustic energy into said acousto-optic medium by said at least one signal launch transducer in response to said electrical signals, wherein a respective signal launch transducer is coupled to a first surface portion of said acousto-optic medium and said electro-thermal element comprises a resistive strip coupled to a second surface portion of said acousto-optic medium adjacent to said first surface portion thereof, said method comprising the steps of:
(a) coupling at least one electro-thermal element to said acousto-optic medium adjacent to said at least one signal launch transducer; and
(b) applying electrical energy to said at least one electro-thermal element;

(c) introducing thermal energy into said acousto-optic medium adjacent to said at least one signal launch transducer; and (d) and causing the overall spatial distribution of thermal energy in said acousto-optic medium to conform with a prescribed characteristic.

14. The method according to claim 13, wherein said acousto-optic device has a plurality of signal launch transducers coupled to the surface of said acousto-optic medium, and to which electrical signals are applied for modulating respective acoustic waves launched into said acousto-optic medium, step (a) comprises interleaving a plurality of electro-thermal elements with said plurality of signal launch transducers on said acousto-optic medium, step (b) comprises applying respective electrical signals to said plurality of electro-thermal elements, step (c) comprises controllably introducing respective thermal energy components into said acousto-optic medium adjacent to said plurality of signal launch transducers, and step (d) comprises causing the overall spatial distribution of thermal energy in said acousto-optic medium to conform with said prescribed characteristic.

15. The method according to claim 13, wherein step (b) comprises:

(b1) defining a prescribed level of electrical energy to be applied to a respective electro-thermal element, (b2) monitoring electrical energy imparted to said acousto-optic medium by said launch transducer, and (b3) controlling electrical energy applied to said respective electro-thermal element as a function of said prescribed level of electrical energy defined in step (a) and electrical energy monitored in step (b).

16. An apparatus comprising:

at least one signal launch transducer coupled to the surface of an acousto-optic medium, and being adapted to receive electrical signals for modulating at least one acoustic wave launched into said acousto-optic medium;

at least one electro-thermal element coupled to said acousto-optic medium adjacent to said at least one signal launch transducer, and being operative, in response to the application of electrical energy thereto, to introduce thermal energy into said acousto-optic medium adjacent to said at least one signal launch transducer, and cause the overall spatial distribution of thermal energy in said acousto-optic medium to conform with a prescribed characteristic, wherein a respective signal launch transducer is coupled to a first surface portion of said acousto-optic medium and said electro-thermal element comprises a resistive strip coupled to a second surface portion of said acousto-optic medium adjacent to said first surface portion thereof.

17. The apparatus according to claim 16, wherein said acousto-optic device has a plurality of signal launch transducers coupled to the surface of said acousto-optic medium, and to which electrical signals are applied for modulating respective acoustic waves launched into said acousto-optic medium, and wherein a plurality of electro-thermal elements are interleaved with said plurality of signal launch transducers on said acousto-optic medium, and are adapted to receive respective electrical signals so as to controllably introduce respective thermal energy components into said acousto-optic medium adjacent to said plurality of signal launch transducers in a manner that causes the overall spatial distribution of thermal energy in said acousto-optic medium to conform with said prescribed characteristic.

18. The apparatus according to claim 16, further including a comparator having an output coupled to a respective electro-thermal element, and being coupled to receive a first input representative of a prescribed level of electrical energy to be applied to a respective electro-thermal element, a second input representative of electrical energy imparted to said acousto-optic medium by said launch transducer, and a third input representative of said output, said comparator being operative to control electrical energy applied to said respective electro-thermal element by said output as a function of said prescribed level of electrical energy and electrical energy imparted to said acousto-optic medium by said launch transducer.

19. The apparatus according to claim 16, wherein said acousto-optic device has a plurality of signal launch transducers coupled a plurality of first surface portions of said acousto-optic medium, and to which electrical signals are applied for modulating respective acoustic waves launched into said acousto-optic medium, and wherein a plurality of electro-thermal resistive strips are disposed on a plurality of second surface portions of said acousto-optic medium adjacent to said first surface portions thereof, and wherein said electro-thermal strips are coupled to receive respective electrical signals, so as to controllably introduce respective thermal energy components into said acousto-optic medium adjacent to said plurality of signal launch transducers in a manner that causes the overall spatial distribution of thermal energy in said acousto-optic medium to conform with said prescribed characteristic.

* * * * *